A. A. RITCHIE.
AUTOMOBILE LOCK.
APPLICATION FILED DEC. 2, 1919.

1,346,135.

Patented July 13, 1920.

INVENTOR
Allen A. Ritchie
BY
Hardway Cathy
ATTORNEYS

UNITED STATES PATENT OFFICE.

ALLEN A. RITCHIE, OF HOUSTON, TEXAS.

AUTOMOBILE-LOCK.

1,346,135.	Specification of Letters Patent.	Patented July 13, 1920.

Application filed December 2, 1919. Serial No. 341,988.

*To all whom it may concern:*

Be it known that I, ALLEN A. RITCHIE, citizen of the United States, residing at Houston, in the county of Harris and State of Texas, have invented certain new and useful Improvements in Automobile-Locks, of which the following is a specification.

This invention relates to new and useful improvements in an automobile lock.

One object of the invention is to provide a lock of the character described, which is specially designed for application to the steering column of a motor vehicle, whereby the steering shaft may be locked against rotation relative to the steering post so as to make it impossible to guide the vehicle, and to thus prevent the theft of the automobile.

Another object is to provide a device of the character described which is simple in construction, which may be manufactured cheaply, which may be easily applied to or removed from the steering column, and which cannot be easily broken or injured.

With the above and other objects in view, this invention has particular relation to certain novel features of construction, arrangement of parts, and use, an example of which is given in this specification and illustrated in the accompanying drawings, wherein.

Figure 1:
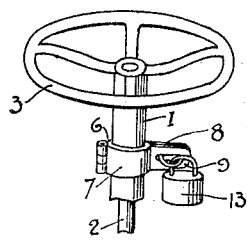
Figure 1, shows a side view of the device applied to the steering column.
Figure 2:
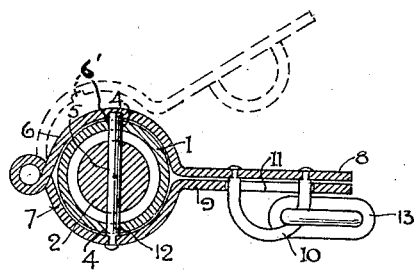
Fig. 2, is a sectional view thereof.
Figure 3:
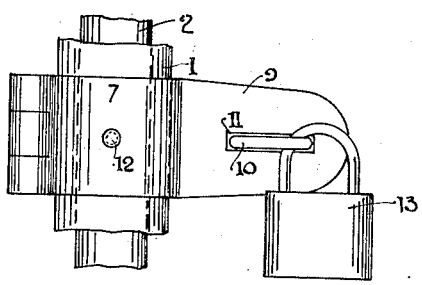
Fig. 3, shows an enlarged side view thereof.

Referring now more particularly to the drawings wherein like numerals of reference designate similar parts in each of the figures, the numeral 1 refers to the steering column of a motor vehicle, having the steering shaft 2 rotatable therein through the hand wheel 3 carried by the upper end of the shaft. The column has oppositely disposed openings 4, 4, therein and the shaft 2 has the hole 5 therethrough, which may be brought into alinement with the openings 4, 4, by a suitable rotation of the shaft 2.

The numerals 6 and 7 refer, respectively, to clamps, which are hinged together at one end and which are formed to conform to the contour of and fit around the column 1, and their free ends are outwardly turned forming the jaws 8 and 9, which fit together and the former of which carries a U bolt, 10, which is adapted to fit through an alined slot 11 cut through the other jaw.

In applying the lock to the steering column the shaft 2 is turned to bring the hole 5 into alinement with openings 4, and the locking pin 12, carried by the clamp 7 is then inserted through the openings 4 and the hole 5, and the clamps closed around the column 1. The inner side of the clamp 6 is provided with a socket 6', into which the free end of the pin 12 projects, when the device is applied, and said pin will thus be anchored, at each end, which will serve to strengthen said pin and prevent the same from becoming bent or broken. When the device is in position, the U bolt 10 will be projected through the slot 11 and the hasp of the lock 13, may be inserted through said U bolt to lock the device on the column. The steering shaft will be locked by the pin 12 against rotation and the vehicle can not be then steered and will thus be protected from theft or unauthorized use.

What I claim is:

The combination with an automobile steering column and shaft having alined holes through the column and shaft, of a pair of arcuate clamps hinged together at one end and adapted to be secured around said column and whose free ends are outwardly turned so as to fit together when clamped in position, a locking pin formed rigidly with and extending inwardly from one of said clamps and adapted to project entirely through all of said holes and secure said shaft against turning relative to the column when the clamps are secured around said column the other clamp having a socket into which the free end of the pin projects whereby said free end is anchored to the last mentioned clamp and a lock for securing the clamps around the column.

In testimony whereof I have signed my name to this specification in the presence of two subscribing witnesses.

ALLEN A. RITCHIE.

Witnesses:
W. J. WALDEN,
E. V. HARDWAY.